May 13, 1947.  J. MORKOSKI  2,420,551
GAUGE WHEEL AND COULTER ASSEMBLY
Filed Nov. 29, 1944
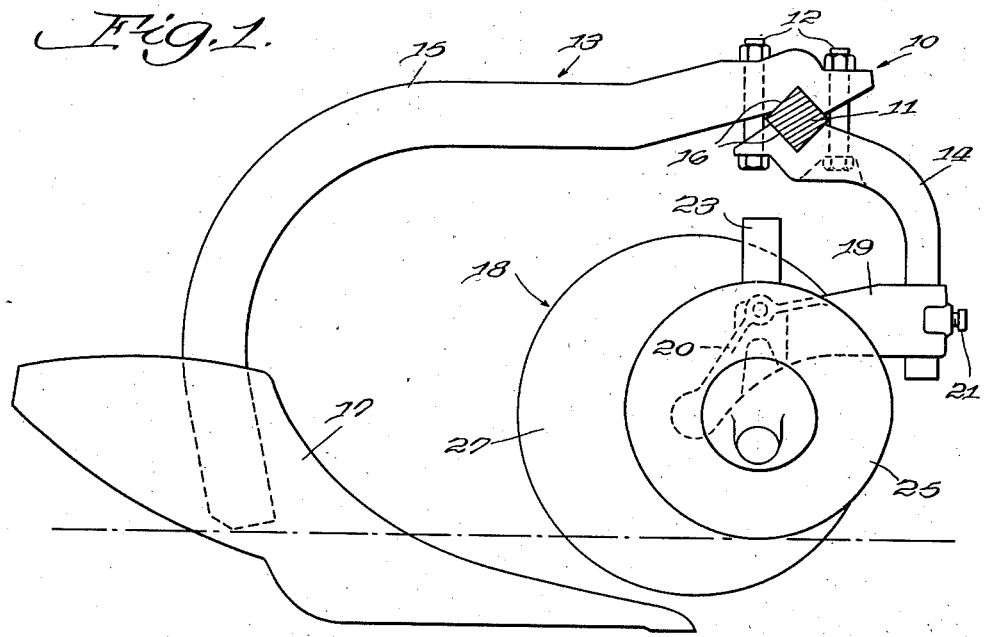
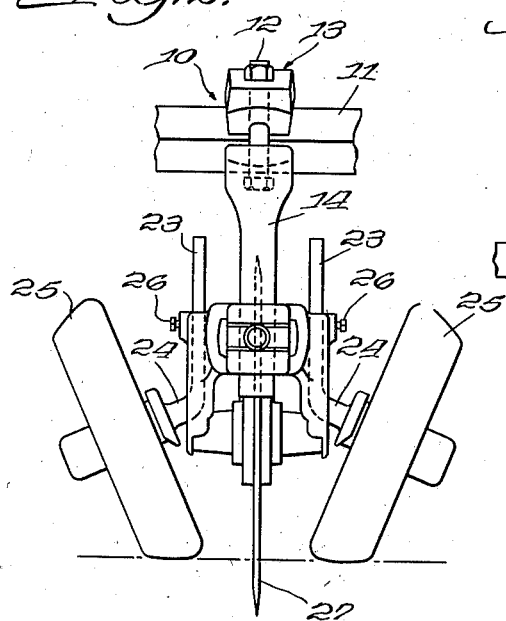
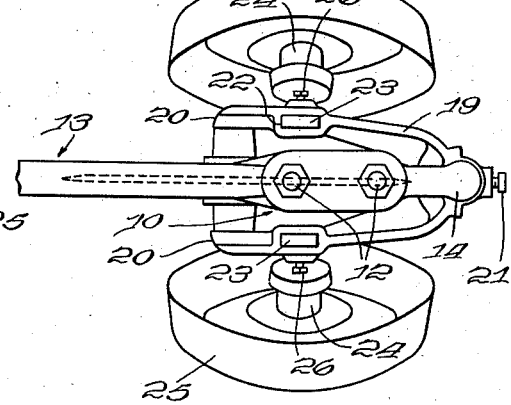
Inventor:
James Morkoski.
By Paul O. Pippel
Atty.

Patented May 13, 1947

2,420,551

UNITED STATES PATENT OFFICE 2,420,551

GAUGE WHEEL AND COULTER ASSEMBLY

James Morkoski, Canton, Ill., assignor to International Harvester Company, a corporation of New Jersey Application November 29, 1944, Serial No. 565,622

3 Claims. (Cl. 97—189)

This invention relates to agricultural implements and particularly to implements involving the use of gauge wheels and coulters.

The problem of providing both gauge wheels and coulters for an implement, such, for example, as a middle buster, has been a difficult one, particularly where the implement is closely coupled to a tractor. This is due to the fact that the gauge wheel and coulter are customarily separated; hence they require too much space and interfere with the efficient operation of the working tool. Such attempts as have been made in the past to bring the gauge wheel and coulter into juxtaposition to meet space requirements have failed largely due to the tendency of these elements to become clogged under damp soil conditions.

An object of the present invention is the provision of a combined gauge wheel and coulter unit adapted to occupy minimum space and to provide maximum efficiency.

Another object is to provide for an agricultural implement, a gauge wheel and coulter in close association and novel means for inhibiting the clogging thereof under adverse soil conditions.

A further object is to provide a combined coulter and gauge wheel unit comprising a coulter and laterally spaced wheels, one on each side of the coulter and smaller in diameter than the coulter, whereby the higher rotary speed of the wheels keeps the soil from sticking either to the wheels or the coulter.

Another object is to provide a combined gauge wheel and coulter unit wherein laterally spaced frusto-conically shaped wheels converge downwardly with the ground-engaging peripheries thereof parallel to the ground, thus shelving the dirt away from the unit upon advance of the implement.

Other objects and advantages will become clear from the following detailed description when read in conjunction with the accompanying drawings, wherein:

Figure 1 is a view in side elevation of an implement in the form of a middle buster with gauge wheel and coulter and embodying the features of the present invention;

Figure 2 is a front elevation of the structure shown in Figure 1; and

Figure 3 is a plan view of the structure shown in Figure 2.

The implement shown in the drawings embodies a tool-supporting structure generally indicated at 10 and including a transverse tool bar 11 adapted to be attached to a tractor or other vehicle for propelling the implement across a field.

To the tool bar 11 is secured by bolts 12 a tool beam 13 extending longitudinally in the direction of travel of the implement when in operation. Beam 13 comprises a forwardly and downwardly extending section 14 and a rear section 15. Sections 14 and 15 are channeled as at 16 to fit the contour of the tool bar 11. The rear section 15 of beam 13 curves downwardly and has secured to the lower end thereof a working tool in the form of a middle buster 17.

In order to open a path for the middle buster 17 and to gauge the depth of operation thereof while utilizing a minimum of space, applicant has provided a combination gauge wheel and coulter unit, generally indicated at 18, secured to the downwardly extending portion of beam section 14 by a standard 19. Standard 19 is in the form of a yoke having rearwardly extending arms 20 and having its bight portion provided with an opening to receive the beam section 14. Standard 19 is vertically adjustable on the downwardly extending portion of section 14 and is adapted to be secured thereto in its adjusted position by a set screw 21.

Near their rear ends the arms 20 of yoke 19 are provided with vertically extending rectangular openings 22 for the reception of the rectangular upright portions of members 23. The lower ends of members 23 are bent outwardly to provide downwardly diverging axles 24 upon which are journaled for rotation laterally spaced ground-engaging wheels 25. Each of the wheels 25 rotates about an outwardly and downwardly extending axis, and each wheel is frusto-conical in shape so that the peripheries thereof engage the surface of the ground and are parallel thereto. Members 23 supporting the wheels 25 are vertically adjustable relative to the yoke 19 and may be secured in adjusted position by the set screws 26.

A coulter 27 is mounted for rotation at the rear end of yoke 19 between the arms 20 thereof. Coulter 27 is larger in diameter than the wheels 25 so that when operating under damp soil conditions the wheels 25 and coulter 27 rotate at different speeds and prevent the soil from sticking to the wheels or to the coulter. The shape of wheels 25 in the form of a frustum of a cone is of particular advantage, since their movement in the direction of operation of the implement causes the soil to shelve away from the unit and prevents its getting between the wheels and the coulter and hampering the operation thereof.

The operation of the gauge wheel and coulter of the present invention should be clear from the foregoing description. The coulter, riding in front of the middle buster 17, opens a path therefor, and the depth of operation thereof is gauged by the wheels 25. Further, it should be noted that the gauge wheel and coulter unit occupies a minimum of space and does not interfere with the successful operation of the implement. Further, the wheels 25 may be adjusted relative to the coulter 27 in order to vary the depth of operation of the latter and, too, the yoke 19 may be vertically adjusted with respect to the beam 13 in order to vary the operating depth of the working tool.

Having described the invention it is understood, of course, that modifications may be made therein without departing from the spirit thereof or the scope of the appended claims.

What is claimed is:

1. The combination with a tool-supporting structure having a working tool secured to one end thereof, of a gauge wheel and coulter unit secured to said structure at a location remote from said tool, said unit comprising a pair of laterally spaced, frusto-conical wheels, means mounting said wheels for rotation in laterally outwardly inclined planes substantially parallel to the direction of travel, an upright coulter between said wheels, and means mounting said coulter for rotation independently of said wheels.

2. In an agricultural implement, in combination, a beam extending in the direction of advance of the implement and having a tool on the rear end thereof, a standard secured to the beam in advance of the tool, a pair of laterally spaced axles, a pair of laterally spaced frusto-conical gauge wheels journaled on said axles for rotation in downwardly converging planes substantially parallel to the direction of travel and having their ground-engaging peripheries parallel to the ground, means for mounting said axles on said standard for vertical adjustment with respect thereto, an upright coulter between said wheels having a diameter greater than that of the wheels, and means for mounting said coulter on said standard for rotation independently of said wheels.

3. A gauge wheel and coulter assembly comprising a support, laterally spaced transversely alined gauge wheels carried by the support for rotation in downwardly converging planes generally parallel to the direction of travel, said wheels being frusto-conical in shape and having their peripheries in contact with and parallel to the ground, a coulter rotatably mounted on the support between said wheels and in general alinement therewith, and means mounting said wheels on said support for vertical adjustment with respect to the support and to said coulter.

JAMES MORKOSKI.

REFERENCES CITED

The following references are of record in the file of this patent:

UNITED STATES PATENTS

| Number | Name | Date |
|---|---|---|
| 1,074,763 | Wills | Oct. 7, 1913 |
| 800,256 | Wood | Sept. 26, 1905 |
| 798,875 | Cone | Sept. 5, 1905 |
| 656,347 | Flanders | Aug. 21, 1900 |
| 800,075 | Coates | Sept. 19, 1905 |